(12) United States Patent
Fukano et al.

(10) Patent No.: US 6,435,568 B1
(45) Date of Patent: Aug. 20, 2002

(54) TUBE JOINT HAVING TIGHTENING MEMBER FOR ACCOMMODATING TUBES OF VARYING WALL THICKNESS

(75) Inventors: Yoshihiro Fukano; Tetsuro Maruyama, both of Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/598,373

(22) Filed: Jun. 21, 2000

(30) Foreign Application Priority Data

Jul. 2, 1999   (JP) ........................................... 11-189711

(51) Int. Cl.[7] ................................................ F16L 25/00
(52) U.S. Cl. ........................................ 285/331; 285/354
(58) Field of Search ................................. 285/331, 353, 285/354, 382.4, 382.5, 384, 386, 387

(56) References Cited

U.S. PATENT DOCUMENTS

| 187,394 A | * | 2/1877 | Leland .................... 285/354 X |
|---|---|---|---|
| 535,236 A | * | 3/1895 | Anderson ................ 285/354 X |
| 2,420,778 A | * | 5/1947 | Herold .................... 285/354 X |
| 2,457,633 A | * | 12/1948 | Borg ........................... 285/331 |
| 4,500,118 A | * | 2/1985 | Blenkush ................. 285/386 X |
| 5,154,453 A | * | 10/1992 | Nishio ..................... 285/423 X |
| 5,709,413 A | * | 1/1998 | Salyers ................... 285/353 X |
| 5,951,060 A | | 9/1999 | Fukano et al. |
| 5,996,636 A | | 12/1999 | Fukano et al. |
| 6,089,621 A | * | 7/2000 | Nishio ........................ 285/331 |

OTHER PUBLICATIONS

Merriam–Webster Collegiate Dictionary, 10th ed., Springfield MA, Merriam–Webster, Inc., p 320, 1997.*

* cited by examiner

*Primary Examiner*—Lynne H. Browne
*Assistant Examiner*—Greg Binda
(74) *Attorney, Agent, or Firm*—Oblon, Spivak, McClelland, Maier & Neustadt, P.C.

(57) ABSTRACT

When an insert member is inserted into a fluid passage of a fluid tube, the fluid tube is diametrically enlarged by a tapered section. When a female thread of a nut member is meshed with a male thread of a main body section, first and second edge sections are engaged so that they bite into the outer circumference of the fluid tube diametrically enlarged by the tapered section. Accordingly, various fluid tubes, which are identical in outer diameter size but which are slightly different in wall thickness, are reliably prevented from disengagement from a tube joint.

9 Claims, 7 Drawing Sheets

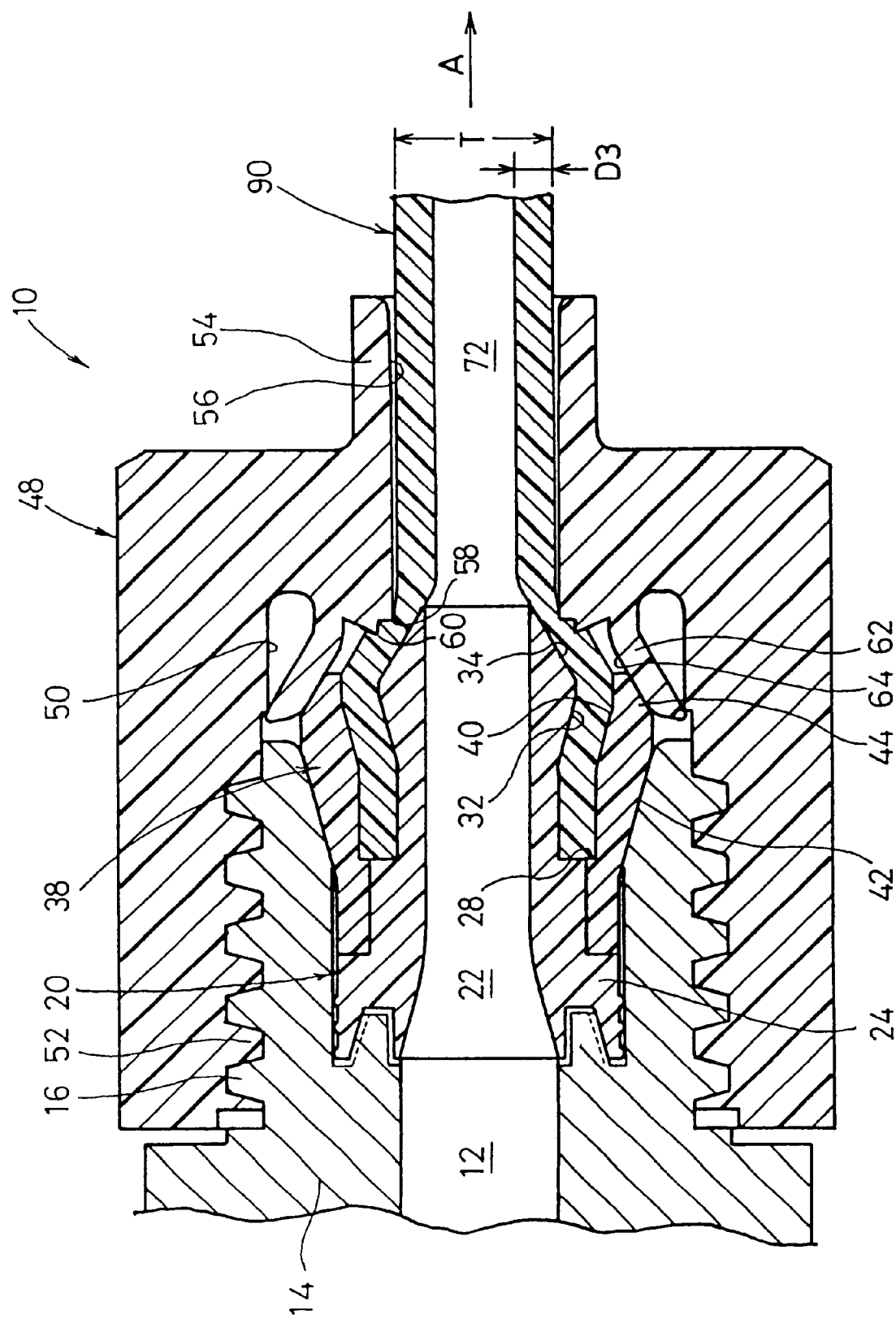

TUBE JOINT HAVING TIGHTENING MEMBER FOR ACCOMMODATING TUBES OF VARYING WALL THICKNESS

BACKGROUND OF THE INVENTION

1. Field of the Invention

The present invention relates to a tube joint to be used in order that a fluid tube, which is formed with a passage for introducing and discharging, for example, a fluid or a pressure fluid, is connected to a fluid pressure-operated apparatus such as a solenoid-operated valve and a cylinder.

2. Description of the Related Art

The tube joint has been hitherto used to connect and couple a fluid tube to a fluid pressure-operated apparatus such as a solenoid-operated valve and a cylinder. An end of the fluid tube having a predetermined outer diameter is connected to the tube joint. The outer circumference of the end of the connected fluid tube is engaged with a fastening section which is formed in an annular configuration on a nut member of the tube joint to avoid disengagement.

However, the conventional tube joint as described above sometimes encounters a situation in which the wall thickness of the fluid tube slightly differs, for example, due to any manufacturing error, even when the outer diameter of the fluid tube is identical. For example, when a fluid tube, which has an identical outer diameter but which has a thin wall thickness as compared with a previously used fluid tube, is used, the force is decreased to fasten the fluid tube by means of the fastening section. As a result, it has been feared that the fluid tube is easily disengaged from a main body section of the fluid pressure-operated apparatus or the like.

SUMMARY OF THE INVENTION

A general object of the present invention is to provide a tube joint which makes it possible to reliably avoid disengagement of a fluid tube with respect to a main body section of a fluid pressure-operated apparatus even in the case of connection of the fluid tube which has a predetermined identical outer diameter but which has a slightly different wall thickness due to any manufacturing error or the like.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 shows still another method for using the tube joint shown in FIG. 1, depicting a longitudinal sectional view of a state in which a fluid tube having a thick wall thickness is connected.

DESCRIPTION OF THE PREFERRED EMBODIMENTS

Figure 1:
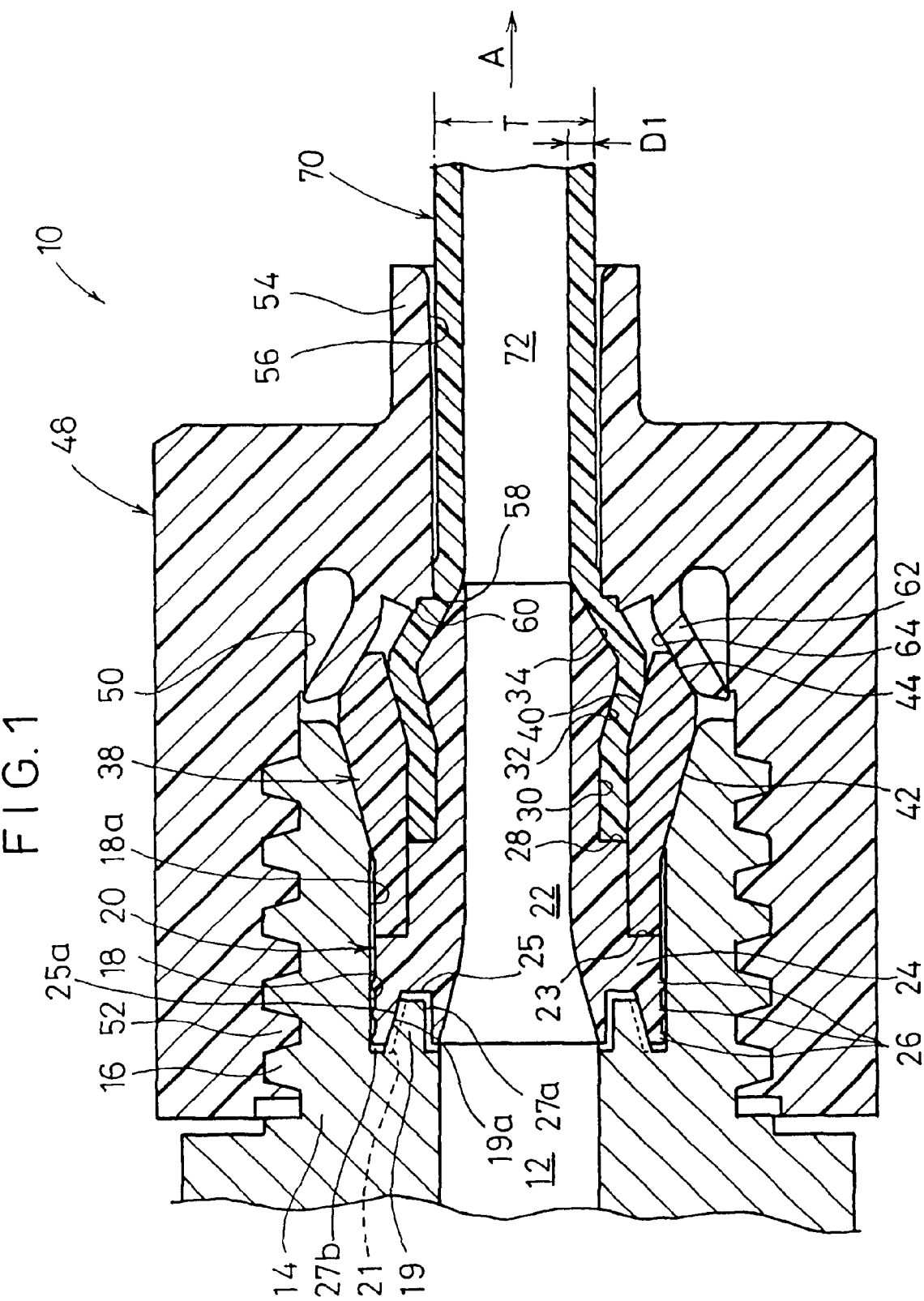
FIG. 1 shows a longitudinal sectional view illustrating a tube joint according to an embodiment of the present invention.
Figure 2:
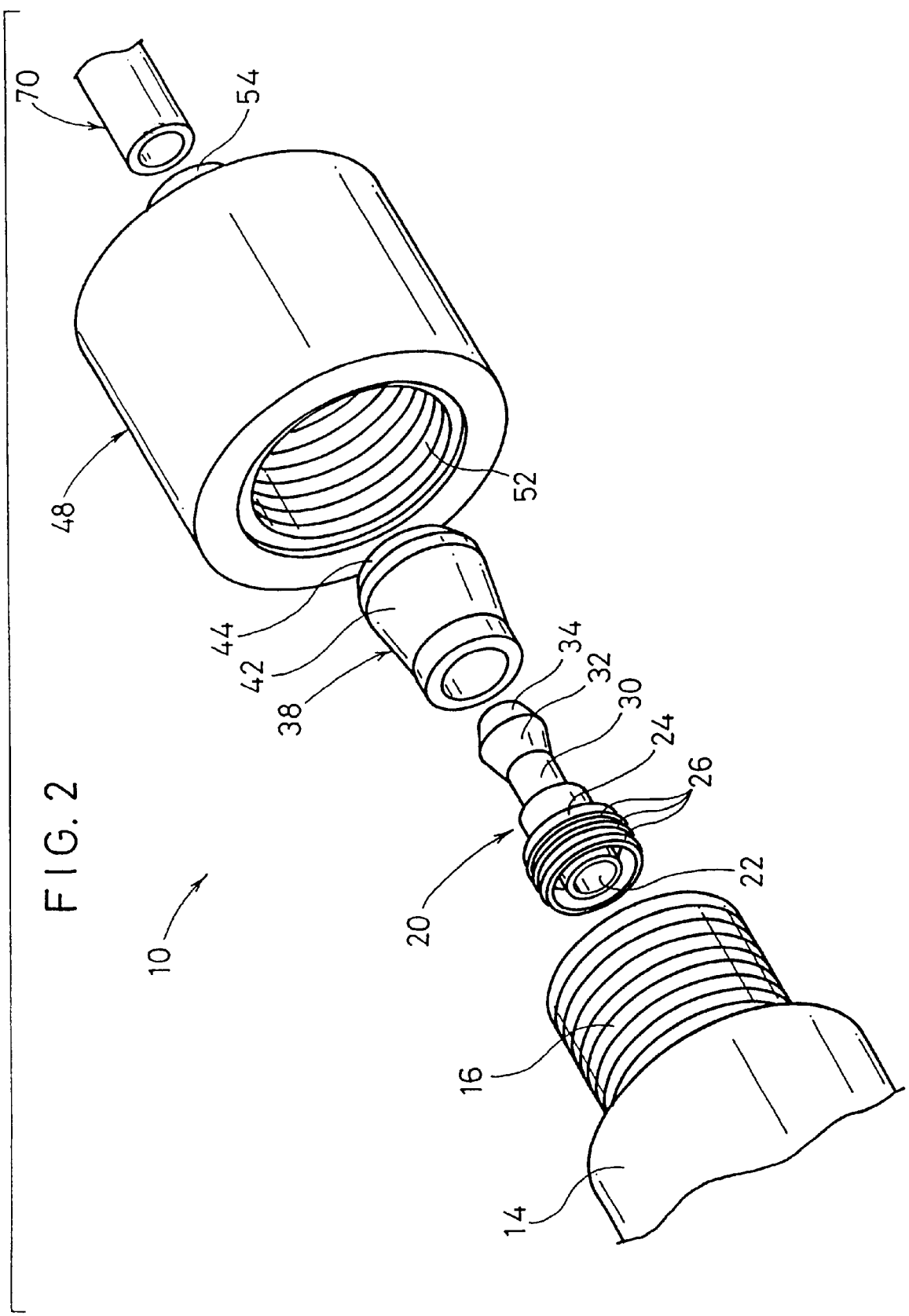
FIG. 2 shows an exploded perspective view illustrating the tube joint shown in FIG. 1.
Figure 3:
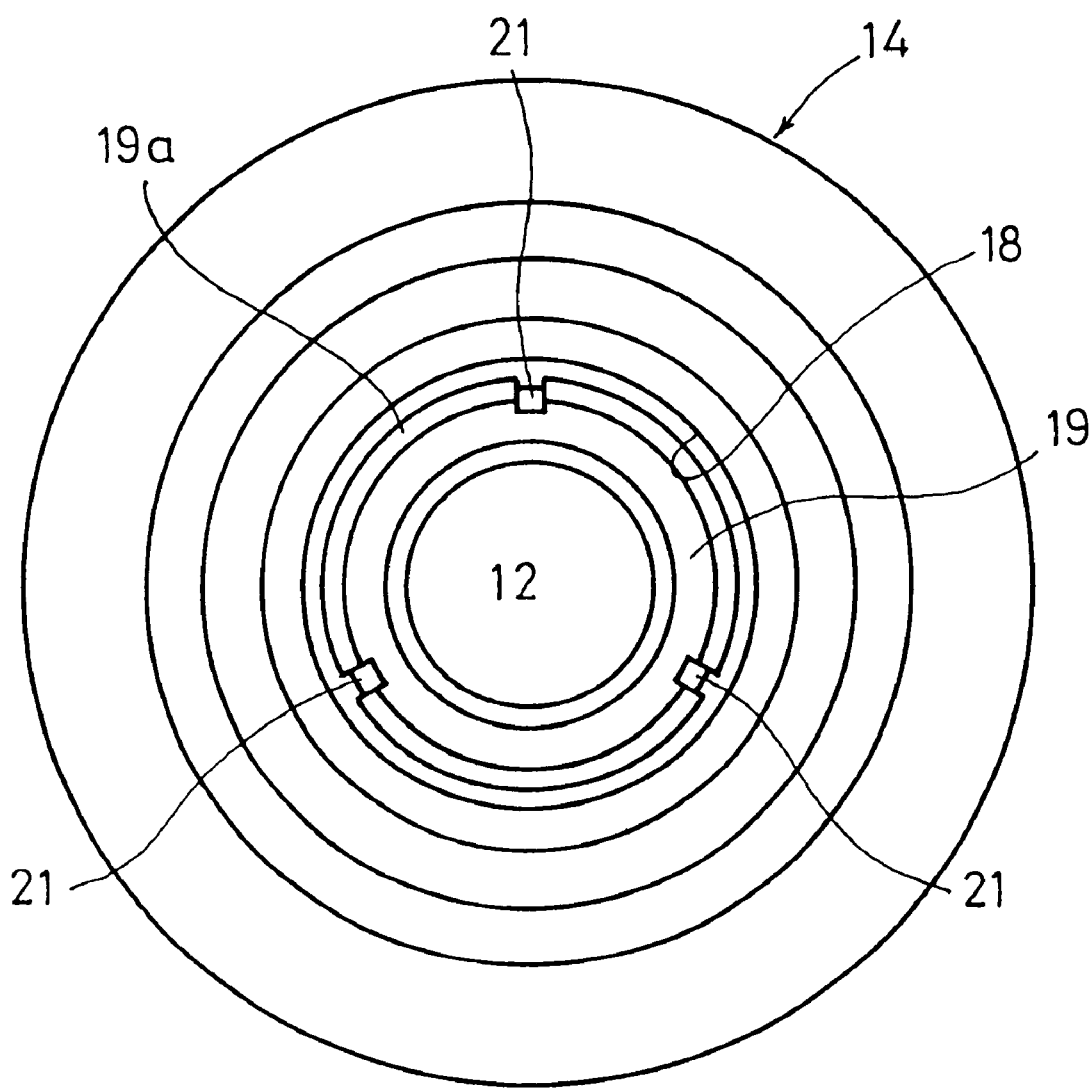
FIG. 3 shows a front view illustrating a main body section shown in FIG. 1.

With reference to FIGS. 1 and 2, reference numeral 10 indicates a tube according to an embodiment of the present invention. The tube joint 10 is connected to a substantially cylindrical main body section 14 which is provided for a fluid pressure-operated apparatus or the like and which is defined with a fluid passage 12. A male thread (thread section) 16 is formed on the outer circumference of the end of the main body section 14. A recess 18 is defined on an inner wall surface of the main body section 14. The inner circumferential surface of the recess 18 is formed as a cylindrical surface 18a. The cylindrical surface 18a is formed to be substantially parallel to the axis of the main body section 14, and it is not provided in an intersecting manner with respect to the axis. An annular projection 19, which protrudes substantially in the horizontal direction as viewed in FIG. 1, is formed on the inner wall surface of the main body section 14. As shown in FIG. 3, a plurality of grooves 21, which are separated from each other by about 120 degrees in the circumferential direction, are formed radially on an inclined outer circumferential surface 19a of the annular projection 19.

Figure 4:
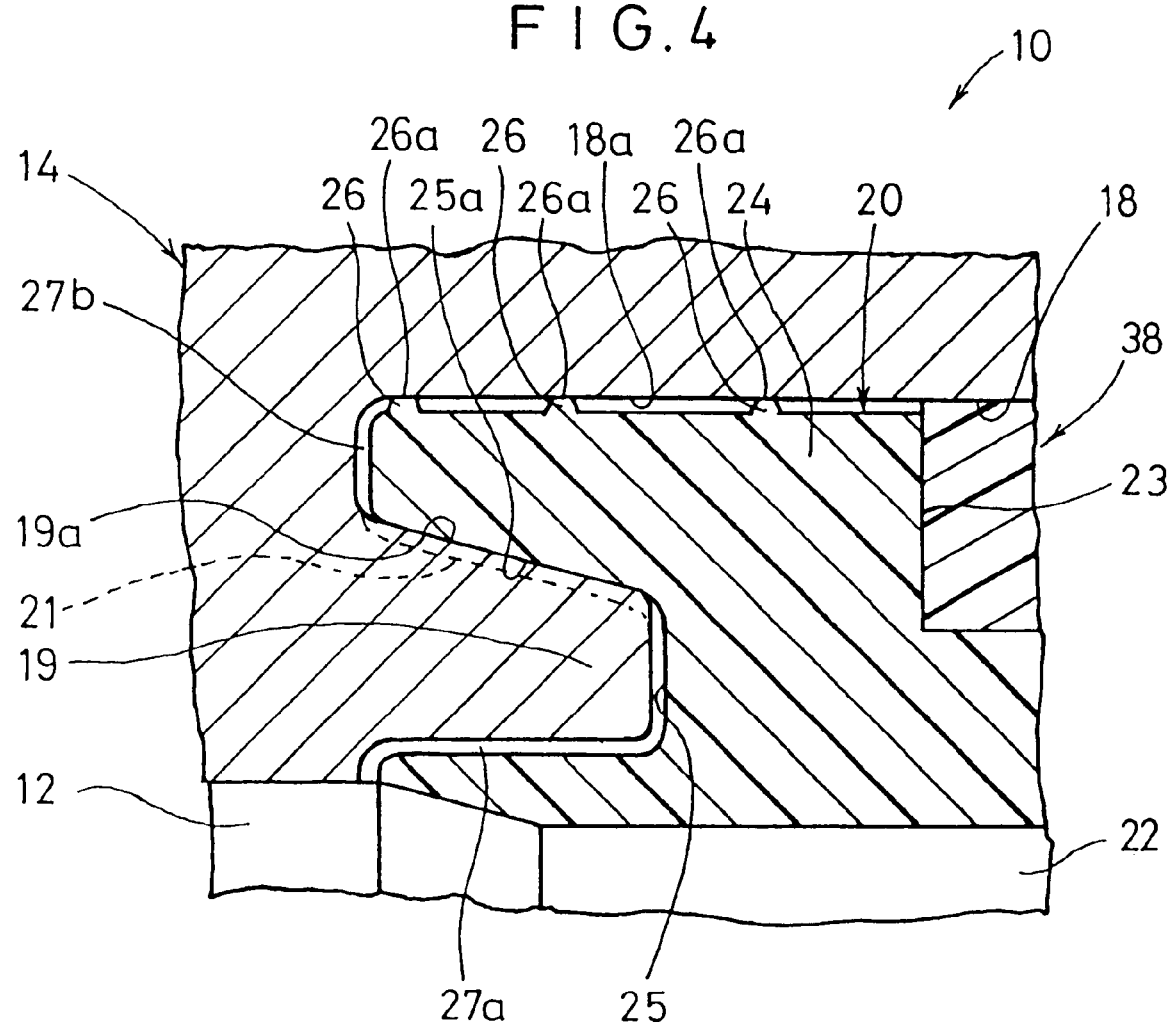
FIG. 4 shows a partial magnified longitudinal sectional view illustrating the tube joint shown in FIG. 1.

As shown in FIGS. 1 and 2, a substantially cylindrical insert member 20 is fitted to the recess 18. A hole 22, which communicates with the fluid passage 12, is defined at the inside of the insert member 20. The wall for forming the hole 22 is formed to be diametrically reduced gradually toward the inside from the side of the fluid passage 12. A fitting section 24 having a large diameter is formed on the outer circumference on the first end side of the insert member 20 with an intervening stepped section 23. As shown in FIG. 4, an annular groove 25 for being fitted to the annular projection 19 is formed at the end of the fitting section 24. When an inclined wall 25a, which forms the annular groove 25, abuts against the outer circumferential surface 19a, clearances 27a, 27b are formed between the main body section 14 and the fitting section 24 except for the portion between the wall 25a and the outer circumferential surface 19a. The respective clearances 27a, 27b communicate with each other via a groove 21.

A plurality of annular projections 26 are formed on the outer circumference of the fitting section 24. The annular projection 26 is formed to have a substantially trapezoidal cross section with its flat top surface 26a which is formed to make contact with the cylindrical surface 18a (see FIG. 4). In this embodiment, the top surface 26a is formed to be substantially parallel to the axis of the insert member 20, and it is not provided in an intersecting manner with respect to the axis. A diametrically reduced section 30, the diameter of which is reduced toward the second end with an intervening stepped section 28, is formed on the outer circumferential surface of the insert member 20. A diametrically enlarged section 32, the diameter of which is gradually enlarged from the end of the diametrically reduced section 30 toward the second end, and a tapered section 34, which continues to the diametrically enlarged section 32 and the diameter of which is gradually reduced toward the end side, are provided on the outer circumferential surface of the insert member 20.

A sleeve 38, which is made of a material such as resin having elasticity, is provided in the recess 18 of the main body section 14 so that a part of the insert member 20 is surrounded thereby. The first end of the sleeve 38 abuts against the stepped section 23 of the insert member 20, and thus the sleeve 38 is positioned with respect to the insert member 20. A diametrically enlarged section 40, which is separated by a predetermined spacing distance from the diametrically enlarged section 32 of the insert member 20 and the diameter of which is gradually enlarged toward the second end side, is formed on the inner circumference of the sleeve 38. A diametrically enlarged section 42, the diameter of which is gradually enlarged toward the second end, and an inclined surface 44, which continues to the diametrically enlarged section 42 and the diameter of which is gradually reduced toward the end side, are provided on the outer circumferential surface of the sleeve 38.

A nut member (tightening member) 48, which is made of a material such as resin having elasticity, is meshed with the male thread 16. A recess 50 is formed at the inside of the nut member 48. A female thread 52, with which the male thread 16 is meshed, is formed on the wall for forming the recess 50. An annular projection 54 is formed at the first end of the nut member 48. A hole 56, which communicates with the recess 50, is defined in the annular projection 54.

Figure 5:
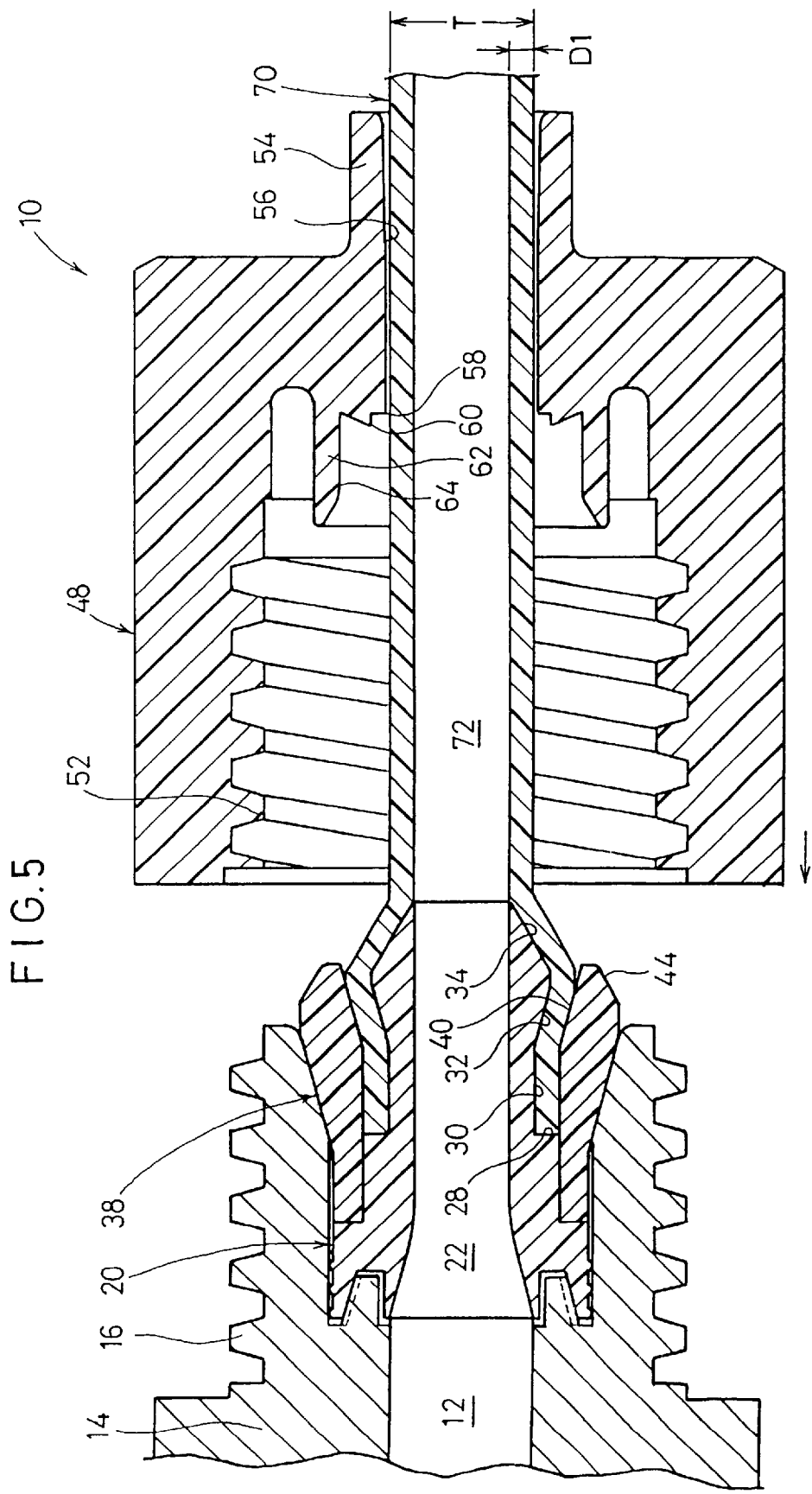
FIG. 5 shows a method for using the tube joint shown in FIG. 1, depicting a longitudinal sectional view of a state in which an insert member is inserted into a fluid tube.

As shown in FIGS. 1 and 5, a first edge section 58, which is formed to have a substantially right-angled vertical cross section and which circumscribes along the opening of the hole 56, is provided on the inner wall surface of the nut member 48. A second edge section 60, which has a diameter larger than that of the first edge section 58 and which has an acute vertical cross section with a saw tooth-shaped configuration, is formed in a circumscribing manner to surround the first edge section 58. Each of the first edge section 58 and the second edge section 60 functions as a fastening section. A cylindrical pressing section 62, which surrounds the second edge section 60, is formed on the inner wall surface of the nut member 48. The inner circumference of the pressing section 62 functions as a pressing surface 64.

The fastening section is not limited to the first and second edge sections 58, 60, which may be constructed by a plurality of annular projections having different diameters respectively.

The tube joint 10 according to the embodiment of the present invention is basically constructed as described above. Next, its function and effect will be explained.

It is assumed that the sleeve 38 is previously installed to abut the stepped section of the outer circumferential surface of the insert member 20.

At first, as shown in FIG. 5, the fluid tube 70, which is set to have an outer diameter size of T and a wall thickness D1 respectively, is inserted into the hole 56 of the nut member 48, in a state in which the nut member 48 is detached from the main body section 14. Subsequently, when the insert member 20 installed with the sleeve 38 is inserted under pressure into the end of the fluid tube 70 by using an unillustrated jig, then the end of the fluid tube 70 is installed between the diametrically enlarged section 32 and the diametrically enlarged section 40 of the sleeve 38 while being diametrically enlarged by the tapered section 34, and the end of the fluid tube 70 abuts against the stepped section 28. Thus, the fluid tube 70 is positioned with respect to the insert member 20. As a result, the fluid passage 12 and the fluid passage 72 make communication with each other via the hole 22. The inner circumferential surface of the fluid tube 70 and the diametrically enlarged section 32 and the tapered section 34 of the insert member 20 are held in a liquid-tight manner or in an air-tight manner.

Subsequently, when the female thread 52 of the nut member 48 is meshed with the male thread 16 of the main body section 14, then the first edge section 58 and the second edge section 60 are displaced toward the tapered section 34, and they are engaged with the outer circumferential surface of the fluid tube 70 diametrically enlarged by the tapered section 34 as shown in FIG. 1. Accordingly, when the fluid tube 70 intends to make displacement in the direction to cause disengagement (in the direction of the arrow A), then the first and second edge sections 58, 60 bite into the outer circumference of the fluid tube 70, the displacement of the fluid tube 70 is obstructed, and the fluid tube 70 is prevented from disengagement from the tube point 10. In this state, the fluid tube 70 is fastened by the first and second edge sections 58, 60. Therefore, the force to fasten the fluid tube 70 is strong as compared with the conventional technique. Thus, the fluid tube 70 is reliably prevented from disengagement from the tube joint 10.

The pressing surface 64 of the pressing section 62 abuts against the inclined surface 44 of the sleeve 38. The pressing section 62 is diametrically enlarged owing to its elasticity, and the inclined surface 44 of the sleeve 38 is diametrically reduced owing to its elasticity. Accordingly, the fluid tube 70 is interposed between the diametrically enlarged section 40 at the inside of the sleeve 38 and the diametrically enlarged section 32 of the insert member 20.

The fluid tube 70 is held by the main body section 14 as described above, and it is used to supply the fluid.

In this state, the top surfaces 26a, which are formed on the annular projections 26 of the insert member 20, are sealed by making contact with the cylindrical surface 18a as shown in FIG. 4. However, the clearances 27a, 27b and the groove 21 are formed between the annular projection 19 and the fitting section 24, and hence no sealing function is effected.

Figure 6:
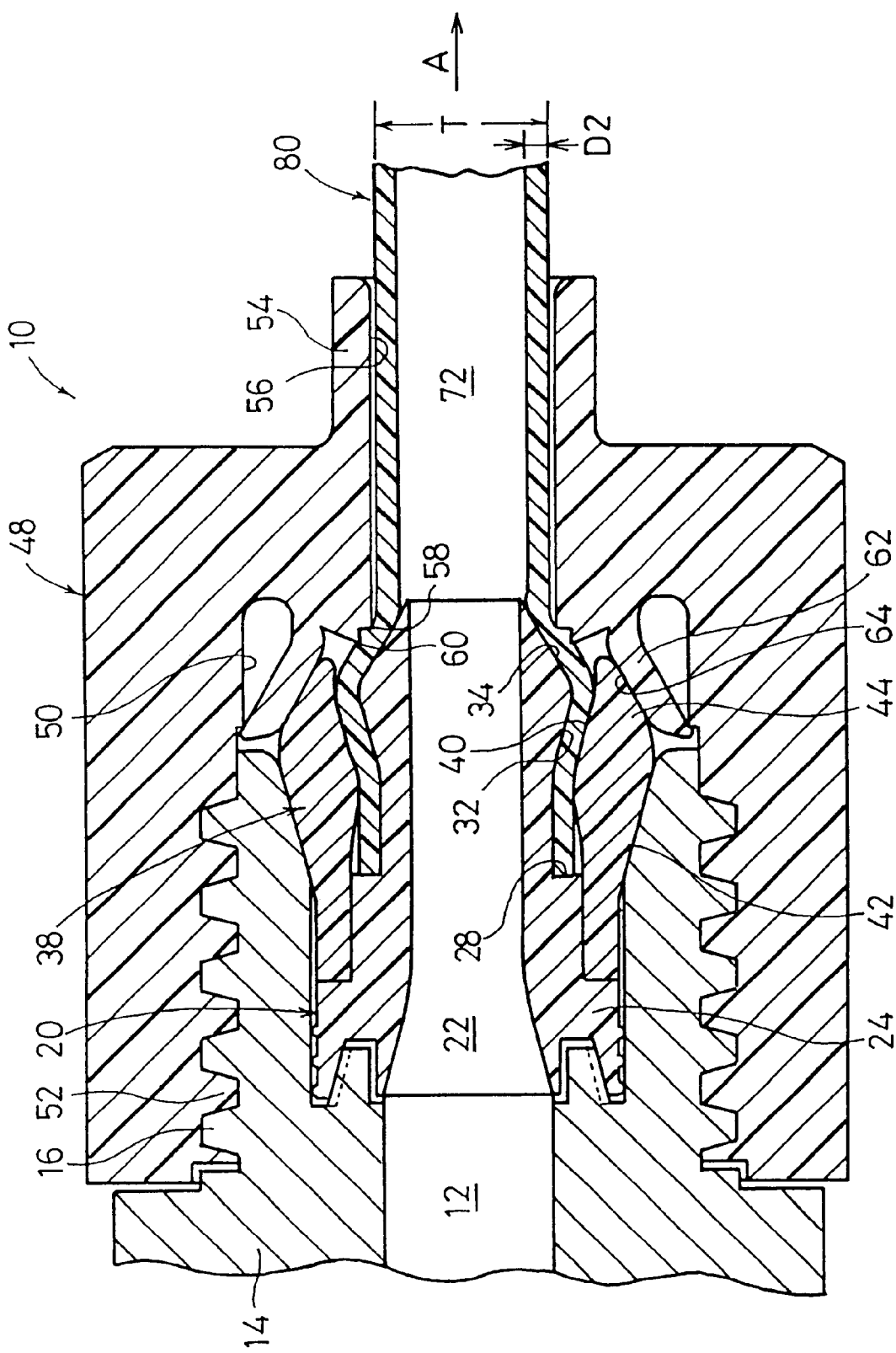
FIG. 6 shows another method for using the tube joint shown in FIG. 1, depicting a longitudinal sectional view of a state in which a fluid tube having a thin wall thickness is connected.

Next, explanation will be made for a case of a fluid tube 80 in which the wall thickness (D2) is slightly thin due to any manufacturing error or the like as compared with the fluid tube 70 described above (D1>D2). As shown in FIG. 6, when the screwing amount of the nut member 48 is increased as compared with the case of the fluid tube 70 described above, then the first and second edge sections 58, 60 further bite into the outer circumference of the fluid tube 80 diametrically enlarged by the tapered section 34, and the pressing surface 64 of the pressing section 62 presses the inclined surface 44 of the sleeve 38. Thus, the fluid tube 80 is interposed between the diametrically enlarged section 40 of the sleeve 38 and the diametrically enlarged section 32 of the insert member 20. Accordingly, even in the case of the fluid tube 80 which has the identical outer diameter size T but which has the thin wall thickness, the fluid tube 80 can be connected to the main body section 14 by the aid of the tube joint 10. The fluid tube 80 is reliably fastened by the first and second edge sections 58, 60. Therefore, the fluid tube 80 can be prevented from disengagement.

On the other hand, explanation will be made for a case wherein a fluid tube 90, in which the wall thickness (D3) is slightly thick as compared with the fluid tube 70 described above (D1<D3), is installed to the main body section 14 by the aid of the tube joint 10. As shown in FIG. 7, when the female thread 52 of the nut member 48 is meshed with the male thread 16, then the first and second edge sections 58, 60 are engaged with the outer circumference of the fluid tube 90 diametrically enlarged by the tapered section 34, irrelevant to the wall thickness of the fluid tube 90, and the first and second edge sections 58, 60 bite into the outer circumference of the fluid tube 90. The fluid tube 90 is interposed between the diametrically enlarged section 40 of the sleeve 38 and the diametrically enlarged section 32 of the insert member 20. Accordingly, even in the case of the fluid tube 90 which has the identical outer diameter size T but which has the thick wall thickness, the fluid tube 90 can be reliably attached to the main body section 14 by the aid of the tube joint 10.

What is claimed is:

1. A tube joint comprising:

a main body section which is defined with a fluid passage;

an insert member which has a tapered section to be inserted into a fluid tube while diametrically enlarging said fluid tube, and which is defined with a hole communicating with said fluid passage;

a sleeve which is provided to surround said fluid tube into which said insert member is inserted, said fluid tube being interposed between said sleeve and said insert member;

a tightening member which is provided with a plurality of annular fastening sections displaceable toward said insert member by being screwed into a thread section of said main body section; and a pressing section which is formed on said tightening member for pressing said sleeve, wherein:

when said fastening sections are displaced toward said tapered section in accordance with a screwing action of said tightening member with respect to said thread section of said main body section, then said fastening sections are engaged with an outer circumference of said fluid tube diametrically enlarged by said tapered section, and said fluid tube is interposed between said fastening sections and said tapered section.

2. The tube joint according to claim 1, further comprising:

an inclined surface which is formed on said sleeve and which is diametrically reduced gradually toward an end, wherein said sleeve is made of a material having elasticity, said pressing section pressing said inclined surface by meshing said tightening member with said thread section of said main body section, such that when said pressing section presses said inclined surface, then said sleeve is diametrically reduced owing to its elasticity.

3. The tube joint according to claim 1, wherein said sleeve is installed to a stepped section which is formed on an outer circumferential surface of said insert member.

4. The tube joint according to claim 1, wherein said fastening sections are a plurality of edge sections to bite into an outer circumferential surface of said fluid tube.

5. The tube joint according to claim 4, wherein said edge sections include an annular projection which surrounds said outer circumferential surface of said fluid tube and which is formed to have an acute-angled cross section.

6. The tube joint according to claim 4, wherein said edge sections include an annular projection which surrounds said outer circumferential surface of said fluid tube and which is formed to have a substantially right-angled cross section.

7. The tube joint according to claim 1, wherein one end of said fluid tube, which is inserted under pressure into a diametrally enlarged section of said insert member, abuts against an annular stepped section formed on an outer circumferential surface of said insert member to be positioned.

8. The tube joint according to claim 1, in combination with said fluid tube, wherein said fluid tube is selected from a group consisting of fluid tubes which are substantially identical in outer diameter size but which are different in wall thickness.

9. A tube joint comprising:

a main body section which is defined with a fluid passage;

an insert member which has a tapered section to be inserted into a fluid tube while diametrically enlarging said fluid tube, and which is defined with a hole communicating with said fluid passage;

an elastic means for surrounding said fluid tube;

a tightening member which is provided with a plurality of annular fastening sections displaceable toward said insert member for diametrically enlarging said fluid tube by being screwed into a thread section of said main body section, and a means for pressing said elastic means, wherein:

when said fastening sections are displaced toward said tapered section in accordance with a screwing action of said tightening member with respect to said thread section of said main body section, then said fastening sections are engaged with an outer circumference of said fluid tube diametrically enlarged by said tapered section, and said fluid tube is interposed between said fastening sections and said tapered section.

* * * * *